July 12, 1932.  E. C. SLOULIN  1,866,776
TAKE-DOWN ALL METAL BOX TRAP
Filed Dec. 14, 1931
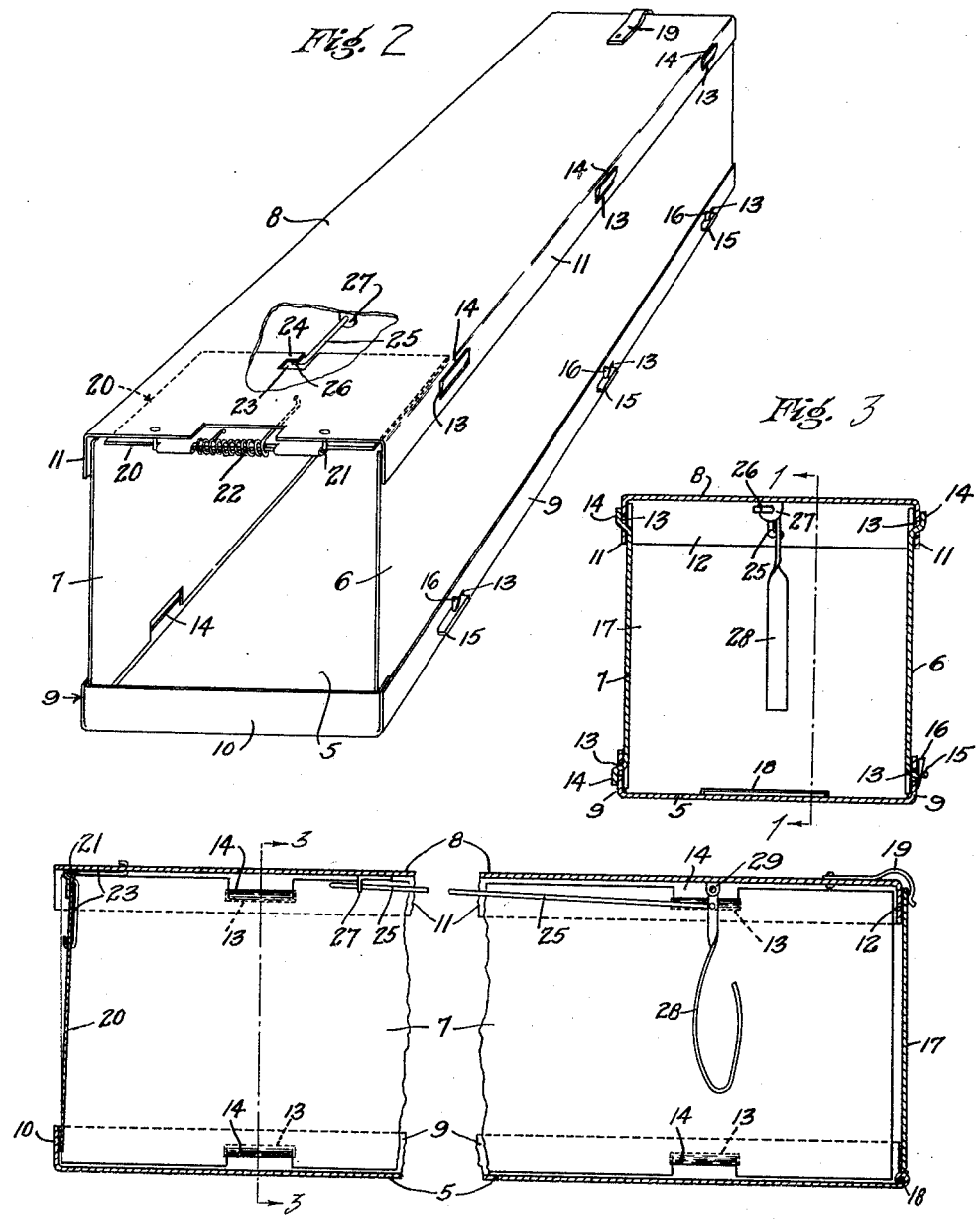
INVENTOR.

Patented July 12, 1932

1,866,776

UNITED STATES PATENT OFFICE

EDNA COOPER SLOULIN, OF SEATTLE, WASHINGTON

TAKE-DOWN ALL METAL BOX TRAP

Application filed December 14, 1931. Serial No. 580,944.

My invention relates to take-down all metal box traps and certain objects of the invention are to provide a trap that is adapted for catching fur bearing animals without injury to the fur or to the animal, and whereby animals whose pelts are unfit for use may be turned loose unharmed. Further objects are to provide novel means whereby the trap may be quickly assembled for use and rapidly taken down and packed in a very compact form for storage or packing and shipping. Another object is to provide a trap having a spring actuated door which is arranged to swing into the trap when same is placed in the set position. Still further objects are to provide a trap having a trigger arrangement for the door whereby the door is released either by a forward or backward movement of the trigger bait hook. And still further objects are to provide a trap that is simple in construction, efficient in use, and which may be manufactured at comparatively small cost.

With the above and other objects in view which will appear as the description proceeds, the invention consists of the novel construction, adaptation, combination and arrangement of parts hereinafter described and claimed. These objects are accomplished by devices illustrated in the accompanying drawing; wherein: Figure 1 is a view of the trap in longitudinal vertical section partly broken away and showing the trigger arrangement with the front and back doors in the closed position and taken substantially on a broken line 1—1 of Fig. 3; Fig. 2 is a view in perspective showing the front door in the open set position; and Fig. 3 is a view in transverse vertical section taken on a broken line 3—3 of Fig. 1.

Referring to the drawing throughout in which like reference numerals indicate like parts, the numeral 5 designates the bottom, the numerals 6 and 7 designate the sides, and the numeral 8 designates the top of the trap, all of which parts are preferably constructed of sheet metal. The bottom is provided with turned-up side flanges 9 and a turned-up front flange 10, while the top is provided with turned-down side flanges 11 and a turned-down rear flange 12. The side flanges 9 and 11 of the bottom and top respectively are provided with spaced apart slots 13. The bottom and top edges of the side 7 and the top edge of the side 6 are all provided with lips 14 that are spaced apart to register with the slots 13. Said lips are formed by cutting into the edge portions of said side and bending said cut portions outwardly and downwardly for the lower lips, and outwardly and upwardly for the upper lips. The lower edge of the side 6 is provided with lips 15 spaced apart to register with the slots 13 and formed by cutting into the edge portion thereof and bending the cut portions outwardly at right angles to said side. In the assembly of the trap all of said lips are inserted into and through the slots 13, and small wedges 16 are driven into a hole provided in each of the extended or exterior portions of the lips 15 and bear against the side flange 9 of the bottom thus retaining the bottom, sides and top in a locked rectangular disposition as most clearly shown in Fig. 3 of the drawing. By means of this novel arrangement the wedges serve as keys for locking the bottom, sides and top together, being inserted last when assembling the trap and removed first when dis-assembling the trap. It will thus be apparent that the trap may be readily set up for use in catching animals and quickly taken down for storage or shipment.

The rear end of the trap is provided with a door 17 which is hinged to the bottom 5 at 18, and a hook spring 19 secured to the top 8 serves as a clasp for retaining said door in the closed position. This rear door is used for access to the trap when setting and baiting and for removing trapped animals from the trap.

The front end of the trap is provided with a door 20 whose upper end is pivotally suspended on a rod 21 having its ends connected to the top 8 of the trap and whereby said door is arranged to swing into the trap. A spring 22, coiled on said rod, is adapted to normally retain the door in the closed position as shown in Fig. 1 with its lower end portion in engagement with the front flange 10 of the bottom 5. It may here be remarked that this door is arranged to swing into the trap in order to avoid any interference of its function by snow or other obstruction which might prevent it from closing. Said front door is provided at its central lower edge portion with an L-shaped slot 23 which forms a small projection 24 for engagement by the trigger rod 25 which will now be described.

The trigger rod 25 is provided with a right angle end portion 26 which engages under the small projection 24 when the door 20 is pivotally raised against the tension of the spring 22 to the set position as clearly shown in Fig. 2, and whereby said door is restrained in the retracted or set position as will be understood. Said trigger rod is slidably disposed through a bracket lug 27 secured to the top 8 at the forward portion of the trap, and the remote end of the rod is fulcrumed to a bait hook 28 the upper end of which is pivotally connected to and suspended from a lug 29 secured to the top 8 in the rear portion of the trap.

Upon entering the trap, an animal must pass to the rear thereof and clear of the front door 20 in order to reach the bait on the bait hook 28. Assuming that the trap is set as shown in Fig. 1, the animal will spring the front door by either pulling or pushing on the bait or bait hook. If he pushes on the bait the end portion 26 of the trigger rod will be moved entirely off of the door or the small projection 24 thereof, while if he pulls on the bait said trigger end portion will slide off of said small projection into the inner reach of the L-shaped slot 23 and it will thus be apparent that in either case the door will snap to the closed position.

Having thus described my invention, it being understood that minor changes in its construction and arrangement may be resorted to without departing from the scope and spirit of the invention, what I claim and desire to secure by Letters Patent of the United States is:—

1. A take-down all metal box trap comprising in combination a bottom having side flanges and a front end flange, a top having side flanges and a rear end flange, said side flanges having spaced apart slots, side walls, lips formed on the upper and lower edges of said walls spaced apart to fit into the slots of the side flanges, wedges installed in holes of the row of lips on one edge portion of said walls whereby the top, bottom and side walls are locked in rectangular disposition, a spring retained door pivoted to the rear end of the trap, a front door pivoted to the front end of the trap, a spring adapted to retain said door in a normally closed position, and trigger means for restraining said door in a retracted set position.

2. In a box trap of the character described, the combination of a door pivoted to the front upper end thereof, a spring adapted to retain said door in a normally closed position, said door arranged to swing into the trap against the upper wall thereof in the retracted set position, said door having an L-shaped slot in its lower edge portion, a trigger rod having a right angle end portion adapted to engage under the metal projection formed by the two reaches of the L-shaped slot whereby said door is restrained in the retracted set position and whereby said right angle end portion releases its hold on said metal projection upon either forward or backward movement of the trigger rod.

3. In a box trap of the character described, the combination of a door pivoted to the front upper end thereof, a spring adapted to retain said door in a normally closed position, said door arranged to swing into the trap against the upper wall thereof in the retracted set position, said door having an L-shaped slot in its lower edge portion, a trigger rod slidably mounted in the top of the trap and having a right angle end portion adapted to engage under the metal projection formed by the two reaches of the L-shaped slot whereby said door is restrained in the retracted set position, a bait hook, the remote end of said trigger rod fulcrumed to said bait hook, and the upper end of said bait hook pivoted to the top of the trap whereby said right angle end portion of the trigger rod is caused to release its hold on the said metal projection upon either forward or backward pivotal movement of the bait hook.

In testimony where I affix my signature.

EDNA COOPER SLOULIN.